(12) United States Patent
van Antwerpen

(10) Patent No.: US 9,262,340 B1
(45) Date of Patent: Feb. 16, 2016

(54) PRIVILEGED MODE METHODS AND CIRCUITS FOR PROCESSOR SYSTEMS

(75) Inventor: Hans van Antwerpen, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 850 days.

(21) Appl. No.: 13/340,418

(22) Filed: Dec. 29, 2011

(51) Int. Cl.
*G06F 12/14* (2006.01)

(52) U.S. Cl.
CPC ............ *G06F 12/14* (2013.01); *G06F 12/1416* (2013.01); *G06F 12/1458* (2013.01); *G06F 12/1491* (2013.01)

(58) Field of Classification Search
None
See application file for complete search history.

(56) References Cited

U.S. PATENT DOCUMENTS

| | | | |
|---|---|---|---|
| 5,293,610 A * | 3/1994 | Schwarz | 711/164 |
| 6,349,057 B2 * | 2/2002 | Hotaka | 365/185.04 |
| 6,349,355 B1 | 2/2002 | Draves et al. | |
| 7,185,183 B1 | 2/2007 | Uhler | |
| 7,600,100 B2 | 10/2009 | Jensen | |
| 7,661,105 B2 | 2/2010 | Watt et al. | |
| 7,788,725 B2 | 8/2010 | Rajendran | |
| 2004/0243783 A1 | 12/2004 | Ding et al. | |
| 2005/0132217 A1 * | 6/2005 | Srinivasan et al. | 713/200 |
| 2006/0143411 A1 | 6/2006 | O'Connor | |
| 2007/0162759 A1 * | 7/2007 | Buskey et al. | 713/182 |
| 2008/0244206 A1 | 10/2008 | Heo et al. | |
| 2009/0049220 A1 * | 2/2009 | Conti et al. | 710/267 |
| 2009/0199048 A1 * | 8/2009 | Aralakuppe Ramegowda et al. | 714/54 |
| 2009/0205050 A1 * | 8/2009 | Giordano et al. | 726/26 |
| 2010/0106954 A1 * | 4/2010 | Muchsel et al. | 713/2 |
| 2011/0161672 A1 | 6/2011 | Martinez et al. | |

FOREIGN PATENT DOCUMENTS

KR 2007107426 11/2007

OTHER PUBLICATIONS

Lanfranco Lopriore, "Hardware/Compiler Memory Protection in Sensor Nodes," WWW.SCiRP.org/journal/ijcns, Aug. 2008, 6 pages.

* cited by examiner

*Primary Examiner* — Jared Rutz
*Assistant Examiner* — Stephanie Wu

(57) ABSTRACT

A system can include a processor coupled to a bus; a first memory coupled to the bus, configured to limit access to a privileged portion according to at least protection values; a second memory coupled to the bus and having a privileged supervisory portion configured to be section erasable, access to the second memory being limited according to at least the protection values; and a boot sequence stored in the privileged portion that configures the processor to decode values stored in the supervisory portion into the protection values for storage in protection value registers.

18 Claims, 15 Drawing Sheets

| Vector | MASTER | CPUSS_SYSREQ NO_RST_OVR | CPUSS_SYSREQ SYSREQ | CPUSS_SYSREQ VECS_IN_RAM | GoTo | Comment |
|---|---|---|---|---|---|---|
| 0,1 | 0 | 0 | X | X | ROM | Reset |
| 0,1 | 0 | 1 | X | X | Flash | Data(LD/ST) |
| 2(NMI) | 0 | X | 0 | 0 | Flash | User NMI or Data |
| 2(NMI) | 0 | X | 0 | 1 | RAM | User NMI |
| 2(NMI) | 0 | X | 1 | X | ROM | System Call |
| 3...47 | 0 | X | X | 0 | Flash | User Exception or Data |
| 3...47 | 0 | X | X | 1 | RAM | User Exception |
| any | 1 | X | X | X | Flash | Debug/ATE access |

FIG. 2

| PROT[3:0] | Flash Encoding | NAME | CPU | Debug | Test |
|---|---|---|---|---|---|
| 0000 | 1 | VIRGIN | Free Access | Free Access | Free Access |
| 0001 | 0 | OPEN | Priviliges Enforced | User Mode Only | User Mode Only |
| 001X | 2 | PROTECTED | Priviliges Enforced | Inoperable | Registers Only |
| 01XX | 3 | KILL | Priviliges Enforced | Inoperable | Inoperable |
| 1XXX | n/a | BOOT | Free Access | Inoperable | Inoperable |

FIG. 4

| Protection | From | To | | | | | |
|---|---|---|---|---|---|---|---|
| | | CPU PPB | ROM | RAM | FLASH | SFLASH | BUS Registers |
| VIRGIN | CPU(PM) | Yes | Exec Only | Yes | Yes | Yes | Yes |
| | CPU(UM) | Yes | Exec Only | Yes | Yes | Yes | Yes |
| | DAP | Yes | No | Yes | Yes | Yes | Yes |
| OPEN | CPU(PM) | Yes | Exec Only | Yes | Yes | Yes | Yes |
| | CPU(UM) | Yes | UM, Exec Only | UM Region | UM Region | Yes | UM Only |
| | DAP | Yes | No | UM Region | UM Region | Yes | UM Only |
| PROTECTED | CPU(PM) | Yes | Exec Only | Yes | Yes | Yes | Yes |
| | CPU(UM) | Yes | UM, Exec Only | UM Region | UM Region | Yes | UM Only |
| | DAP | No | No | No | No | No | UM Only |
| KILL | CPU(PM) | Yes | Exec Only | Yes | Yes | Yes | Yes |
| | CPU(UM) | Yes | UM, Exec Only | UM Region | UM Region | Yes | UM Only |
| | DAP | No | No | No | No | No | No |
| BOOT | CPU(PM) | Yes | Exec Only | Yes | Yes | Yes | Yes |
| | CPU(UM) | Yes | Exec Only | Yes | Yes | Yes | Yes |
| | DAP | No | No | No | No | No | No |

FIG. 5

```
//place SystemCall from user mode void SystemCall(int16 cmd, int32 arg)
{
      CPUSS_ARG= arg;
      CPUSS_SYSREQ= cmd | (1U<<31);
      while(CPUSS_SYSREQ & (1U<<31))
            asm {WFI};
}
```

FIG. 11

```
//allow NMI hander to copy itself from flash – in event of patch table typedef void SystemCallFunction(int32 arg, bool src);
SystemCallFunction _rom _privileged SysCallTable[SYSCALL_CNT];
extern int _flash _privileged PatchTableCnt;
extern SystemCallFunction _flash _privileged SysCallPatchTable[];

//Must be non-privileged because we are not in privileged mode yet void _rom _isr NmiHandler()
{
        // Can only get here form an NMI ISR (hardware interlocked)
        CPUSS_SYSREQ |= PRIVILEGED;
        if((CPUSS_SYSREQ & SYSREQ)==1)
        {
                //Call the right SystemCall routine
                int16 cmd= CPUSS_SYSREQ.COMMAND;
                bool src= CPUSS_SYSREQ.HMASTER
                int32 arg=CPUSS_SYSARG;
                if(CPUSS_PRIV_FLASH.FLASH_LIMIT < FLASH_SIZE)
                {
                        if(cmd < PatchTableCnt)
                        {
                                if(uint32)SysCallPatchTable[cmd] < 0x10000000)
                                {
                                        // Calling a patched routine in flash
                                        // Jump to a copy of self in Flash
                                        asm
                                        {
                                        <branch to NmiHandlerInFlash.ENTRY1>
                                        ENTRY1:
                                        }
                                        (*SysCallPatchTable[cmd])(arg,src);
                                }
                                else
                                {
                                        //calling a ROM routine
                                        (*SysCallPatchTable[cmd])(arg,src);
                                }
                        }
                }
        }
```

FIG. 12A

```
        else
            {
                if(cmd < SYSCALL_CNT)
                {
                    (*SysCallTable[cmd])(arg,src);
                }
            }
    }
    // Clear both PRIVILEGED and SYSREQ flags
    CPUSS_SYSREQ=0;
}
//Must be non-privileged because we are not in privileged when exiting
//Must be exact source copy of NmiHandler() in ROM
void _flash _isr NmiHandlerInFlash()
{
    <same code as NmiHandler()..>
}
```

FIG. 12B

PRIVILEGED MODE METHODS AND CIRCUITS FOR PROCESSOR SYSTEMS

TECHNICAL FIELD

The present disclosure relates generally to processor systems, and more particularly to protection modes for processor systems.

BACKGROUND

Some systems, such as microcontrollers, programmable systems-on-chip, or application specific standard part (ASSP) can include a processor that operates according to code stored in one or more memory circuits. However, in some conventional systems, such processors do not have a built-in privilege mode for limiting access to memory circuits and registers of the system.

BRIEF DESCRIPTION OF THE DRAWINGS

FIG. 2 is a table showing vector relocation in a processor system according to an embodiment.

FIG. 4 is a table showing protection modes for a processor system according to an embodiment.

FIG. 5 is a table showing restrictions in a processor system for different protection modes according to an embodiment.

FIG. 11 is a diagram showing a system call function according to one particular embodiment.

FIGS. 12A and 12B are diagrams showing an interrupt handler corresponding to the system call function of FIG. 11, according to a particular embodiment.

DETAILED DESCRIPTION

Various embodiments will now be described that include processor systems, associated circuits, and methods for enabling protected modes of operation. Such embodiments can implement privileged modes of operation for systems having processors that do not have such features built-in.

Figure 1A:
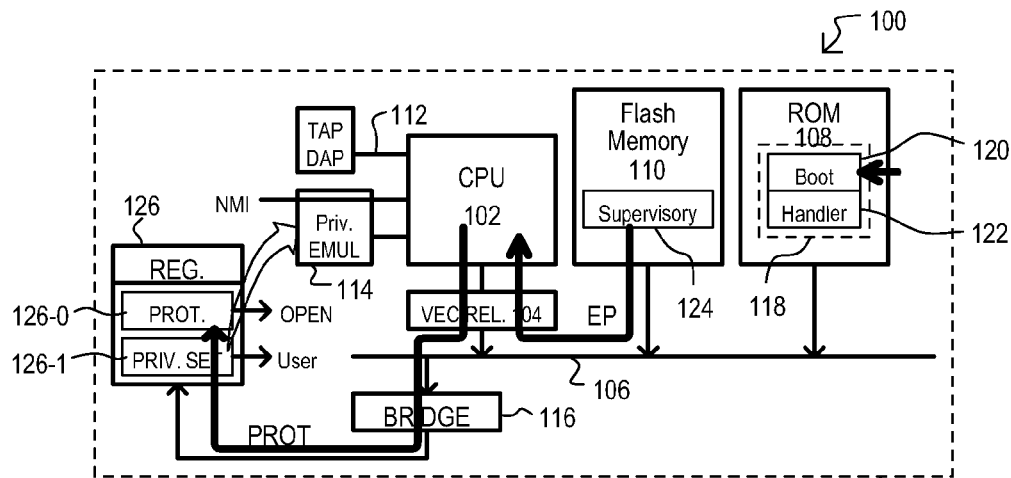
FIGS. 1A to 1C are block schematic diagrams showing a system and operations according to an embodiment.
Figure 1B:
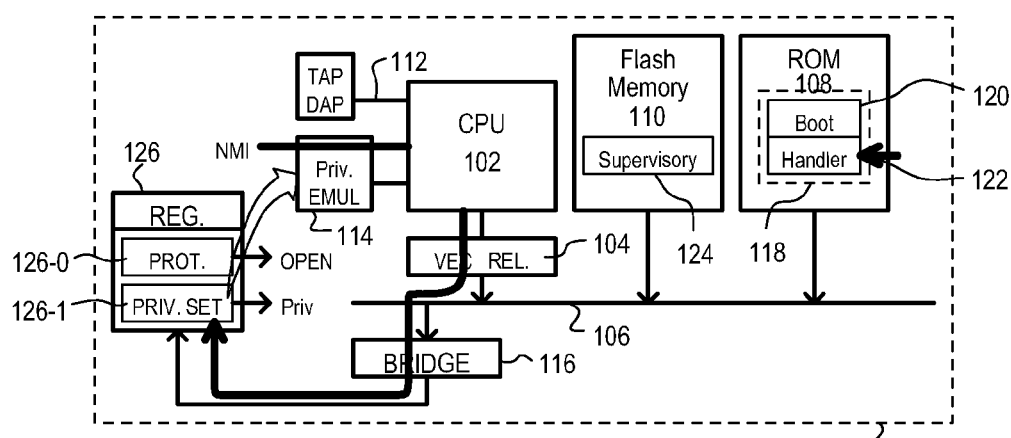
Figure 1C:
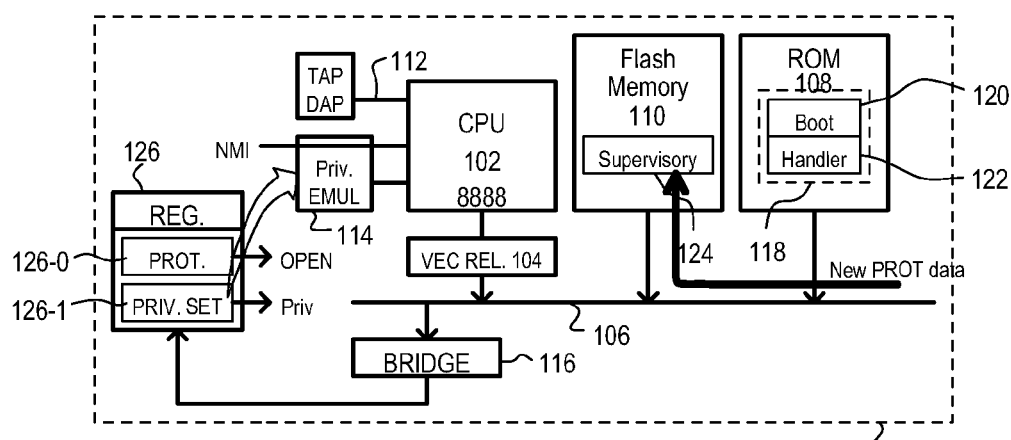

Referring now to FIGS. 1A to 1C, a processor system 100 according to one embodiment is shown in block schematic diagram. System 100 can include a processor 102, a vector relocator 104, a system bus 106, a first memory 108, a second memory 110, a test access port 112, a privilege mode emulator 114, and a bus bridge 116.

In some embodiments, the various parts of the system 100 can be formed in a same integrated circuit package 117. In a particular embodiment, the various parts of the system 100 can be formed in a same integrated circuit substrate. A system 100 can take various forms, including but not limited to: a microcontroller, system-on-chip, or application specific standard product (ASSP).

Further, in some embodiments, portions of system 100 can be formed with programmable circuits. In one embodiment, a vector relocator 104 and privilege mode emulator 114 can be formed all, or in part, with programmable logic circuits.

A processor 102 can execute instructions stored in first or second memories (108/110) (or other memories not shown). In the embodiment shown, the processor 102 can be respond to hardware related event, such as a reset or interrupts by initiating requests to predetermined addresses. A vector relocator 104 can redirect vector calls from a processor 102 according to values stored in privileged registers. It is understood that a privileged registers can only be accessed when the system 100 is in a privileged mode, as will be described herein, and equivalents. Accordingly, a vector relocator 104 can alter addresses issued by processor 102 before such addresses are applied to bus 106. When not servicing a vector call, addresses and data can pass-through a vector relocator 104.

A bus 106 can be an address and data bus having control/status lines, address lines and data lines. A bus 106 can include one or more protection mode lines that can signify a privileged mode of operation. In one embodiment, a protection mode line(s) can be driven according values established by privileged mode emulator 114.

A first memory 108 can include a privileged section 118, and in the embodiment shown can be system read-only-memory (ROM). First memory 108 can include hardware for limiting access to its privileged section 118. In some embodiments, privileged section 118 can only be accessed in response to predetermined events, such as a reset of the system 100 or one or more nonmaskable interrupts (NMIs). In the embodiment shown, within privileged section 118 can be a boot sequence 120 and a handler 122. A boot sequence 120 can be a sequence executed by processor 102 in the event of a reset event. A handler 122 can service one or more predetermined NMIs, as will be described in more detail below.

A second memory 110 can include a supervisory section 124. A supervisory section 124 can also be a privileged memory region. Further, a supervisory section 124 can have limitations on how data is accessed. In particular, certain data values can be written (e.g., programmed) to bit locations, but other data values require block clearing of such values. In one embodiment, a second memory 110 can be a flash type electrically erasable programmable read-only-memory, the implements block erase. However, alternate embodiments may include other types of memories that implement a block type erase, or equivalent function. Such a block erase function can enable stored data to be cleared when switching from a higher protection state (i.e., a state that prevents access to more locations) to a lower protection state.

A test access port 112 can enable access to the system 100 for testing and/or debugging. As will be described in more detail below, a test access port 112 can allow free access, limited access, or no access to various regions of the system 100 depending upon a protection mode.

A privilege mode emulator 114 can generate a privilege mode indication based on privilege mode register values 126. Such register values 126 can be programmed by operation of handler 122, as described herein, or an equivalent. A privilege mode emulator 114 can receive NMI signals, and generate its own NMI signal(s). Control registers 126 can be privileged registers for storing values that establish protection modes for system 100. In the embodiment shown, control registers can include a protection mode register 126-0 and a privilege mode register 126-1.

A bridge 116 can allow other portions of a system or other devices to share bus 106. In the embodiment shown, control registers 126 can be accessed via bridge 116.

It is understood that a system 100 can include various other system circuit resources accessible via bus 106. Access to such system circuit resources can be limited based on a protection mode of the system (i.e., established by values in register 126-0). System circuit resources can include, but are not limited to, other memories, and other registers, including control registers.

FIGS. 1A to 1C show how protection modes of operation can be established according to one embodiment.

Referring to FIG. 1A, in the event of a reset condition, a system 100 can enter a boot state. In a boot (BOOT) state, protection mode register 126-0 can output predetermined protection values, established by hardware, that indicates the BOOT state. Such BOOT state protection values can place test access port 112 into a stalled state preventing access to system 100 via such a port. In response to the reset condition, a processor 102 can execute boot sequence 120. A boot sequence 120 can result in processor 102 reading an encoded protection mode value (EP) from supervisory section 124, decoding such a value, and writing the decoded protection value (PROT) into protection mode register 126-0. Once such a value is written into protection mode register 126-0, a protection mode for the system 100 can be established. In one embodiment, protected states established from decoded values stored in supervisory section can be different from the BOOT state. That is, a BOOT mode can be a transitory mode used to establish a programmed protection level for the system 100.

An encoded protection value (EP) stored within supervisory section 124 can be altered to change a protection mode for a system 100. However, as will be described in more detail below, such changes in protection mode can be restricted, with changes to lower protection modes resulting in an erasure of code subsequently programmed for the system 100.

FIGS. 1B and 1C show the changing of a protection mode for a system 100. Referring to FIG. 1B, in response to an NMI, a processor 102 can execute handler 122. A handler 122 can initiate a write to privilege mode register 126-1. If suitable hardware conditions exist, a system function can be executed that can enable a write to flash memory 110.

Referring to FIG. 1C, once in a privileged mode, accesses to supervisory section 124 can be allowed, subject to protection mode policies. In particular, returns to lower protection states can result in an erasure of entire sections of flash memory 110.

As noted above, embodiments can include a vector relocator (e.g., 104) for remapping requests made by a processor 102. Such remapping according to one embodiment will now be described.

FIG. 2 is a table showing vector relocation according to an embodiment.

In FIG. 2, column "Vector" indicates a vector called by a processor. Column "MASTER" indicates system bus signal that can identify the origin of a request, with a 0 indicating a processor call and a 1 indicating a call from elsewhere. Columns are shown for three configuration bits: CPUSS_SYSREQ.NO_RST_OVR, CPUSS_SYSREQ.SYSREQ, CPUSS_SYSREQ.VECS_IN_RAM. Such configuration bits can be stored in a privileged mode register (e.g., 126-1). Column "Go To" shows how a vector call can be redirected to any of numerous other locations. In the embodiment shown, a system can include a ROM, Flash Memory, and random access memory (RAM). Column "Comments" describes the type of vector. Values 0 and 1 indicate bit values, with X indicating a don't care value.

Configuration bit CPUSS_SYSREQ.NO_RST_OVR can indicate a non-reset indication bit. Thus, when such a value is false (0), vector calls to 0,1 can indicate a reset event, and the system is directed to execute code in ROM. However, when such a bit value is true (1), a vector call to 0,1 can be directed to a location in Flash memory. Such a capability can enable test routines to be executed in a flash memory.

Configuration bit CPUSS_SYSREQ.SYSREQ can indicate a system call. A system call can access privileged sections of a ROM under certain conditions (including an NMI). Accordingly, when such a bit value is set (e.g., 1), the vector call for the NMI is directed to executable code in ROM. However, when such a bit is not set, it is possible to re-direct vector calls to Flash or RAM (e.g., appropriate user NMI handlers can be stored in Flash or RAM).

Configuration bit CPUSS_SYSREQ.VEC_IN_RAM can indicate when a vector is stored in RAM. Accordingly, a vector call can be re-directed to RAM of such a bit is set.

In this way, vector relocation can be accomplished, however reset vectors and NMI vectors can be forced to secure executable locations within a system ROM.

Figure 3:
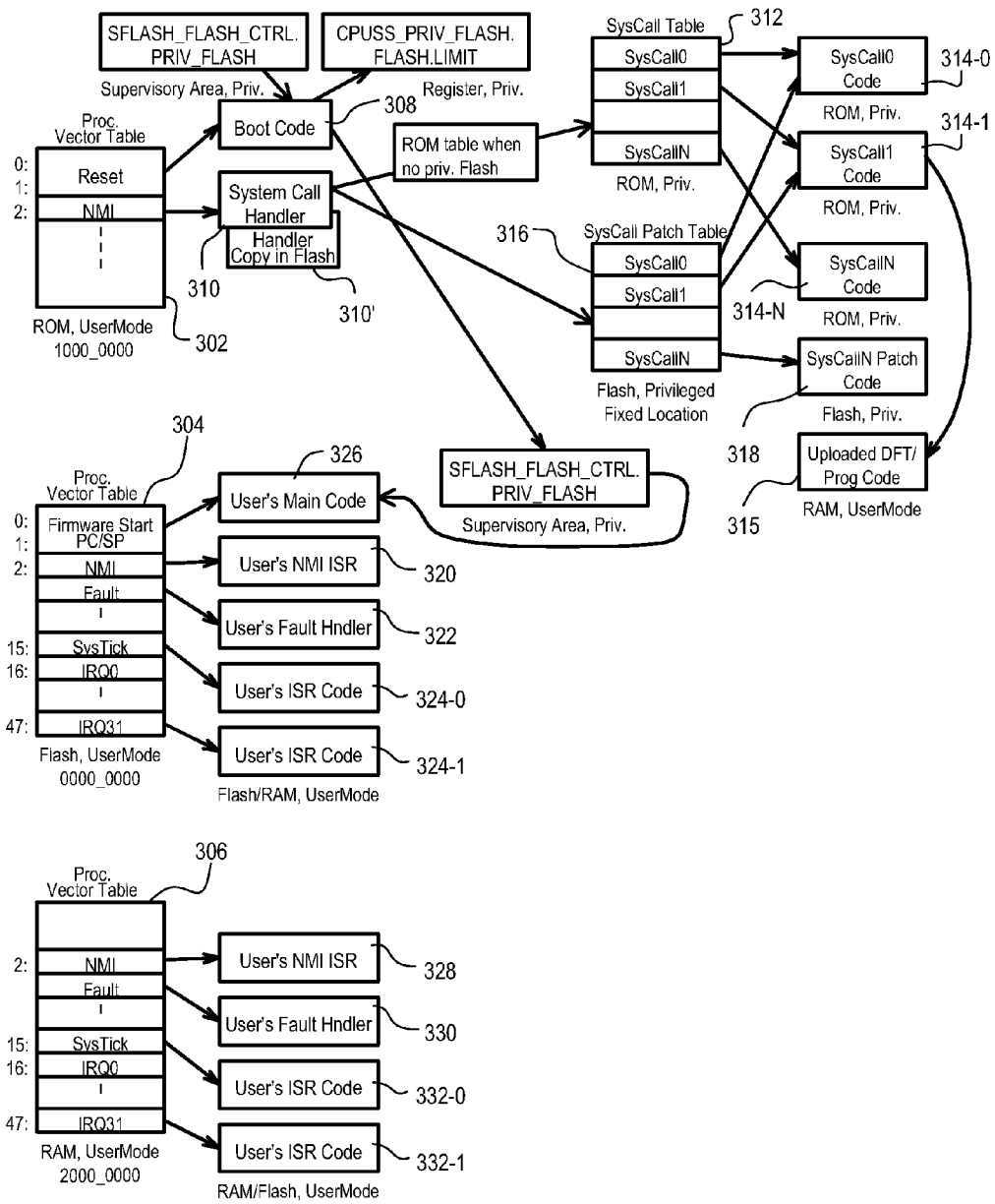
FIG. 3 is a diagram showing vectors and handlers in a processor system according to an embodiment.

FIG. 3 is a diagram showing vector tables and corresponding handlers and responses according to an embodiment. FIG. 3 shows how vector handlers can be used, under suitable conditions, to access privileged regions of a system.

FIG. 3 shows a ROM vector table 302, a Flash vector table 304 and RAM vector table 306. In the embodiment shown, reset vector calls are not redirected, and so will access ROM vector table 302. In the reset case, ROM vector table 302 can point to boot code 308. Boot code 308 can access a flash limit register (CPUSS_PRIV_FLASH.FLASH_LIMIT) and user start address (SFLASH_FLASH_START) according to a privileged flash access register (SFLASH_FLASH_CTRL. PRIV_FLASH). As shown in FIG. 3, registers CPUSS_PRIV_FLASH.FLASH_LIMIT and SFLASH_FLASH_START can be located in a supervisory area of a Flash memory, while register CPUSS_PRIV_FLASH. FLASH_LIMIT can be a privileged register.

Referring still to FIG. 3, NMI vectors calls can be selectively redirected according to register values. Referring back to FIG. 2, if a system call is indicated (e.g., CPUSS_SYSREQ.SYSREQ=1), the ROM vector table 302 is accessed. A corresponding system request hander 310 can be executed, or alternatively, a copy of a handler 310' residing in Flash memory can be executed. If a system does not include a privileged area in the Flash memory, an appropriate system call routine can be looked up from a privileged area of the ROM 312, and the system call function (e.g., one of 314-0 to -n) can be executed. In the event the Flash memory includes a privileged area, and a patched system call routine exists, a handler 310/310' can look up the patched system call routine from a privileged section of the Flash memory 316, the patched system call function 318 can be executed. In the particular embodiment shown, a selected system call function (314-1) can upload test code to a RAM 315.

Referring still to FIG. 3, if an NMI vector call is not a system call (e.g., CPUSS_SYSREQ.SYSREQ=0), a user's NMI handler 320 can be called from a non-privileged (e.g., user mode) section of Flash or RAM. As shown, vector calls to the Flash memory vector table 304 can result in a suitable user handler (e.g., fault handler 322, interrupt service request 324-0/1) stored in the Flash memory or in RAM. In one particular embodiment, vectors 0,1 in the Flash vector table 304 can include start addresses for a user's main code (e.g., firmware) 326. Such start addresses can be used only if register SFLASH_FLASH_START has a particular value (i.e., SFLASH_FLASH_START=FFFF_FFFF), otherwise, an address in register SFLASH_FLASH_START can be used as a firmware start address.

Vector calls to the RAM vector table 306 can also result in a suitable user handler (e.g., user NMI hander 328, fault handler 330, interrupt service request 332-0/1) stored in the Flash memory or in the RAM.

As noted above, a system according to embodiments can include multiple protection modes, including a transitory BOOT mode. System protection modes according to one particular embodiment will now be described with reference to FIGS. 4 and 5.

In FIG. 4, column NAME identifies different modes. Column "PROT[3:0]" shows bit values in a protection value register corresponding to the different modes. An "X" indicates a don't care value (i.e., bit value does not affect mode). As shown, a most significant bit PROT[3] can be "1" in the transitory BOOT mode. A boot sequence can overwrite such a bit value when any of the other protection modes (VIRGIN, OPEN, PROTECTED, KILL) is established. Registers storing protection values PROT[3:0] are writable from a privileged mode only.

Column "Flash Encoding" shows how a protection value can be encoded in a Flash memory. Such encoding can ensure that if a programming operation to a portion of the memory (e.g., supervisory section) is interrupted between an erase and program action, the system can be placed in the OPEN mode. While FIG. 4 shows such an encoding for a Flash memory, embodiments utilizing other memories can be adjusted accordingly (i.e., if a memory erases to a 1 state, OPEN would be encoded as 111).

Column "CPU" shows restrictions on a processor in the different modes. Similarly, column "Debug" shows restrictions on accesses from a debug access port, and "Test" shows restrictions on accesses from a test port.

As shown, in a VIRGIN mode, restrictions on accesses can be removed. A VIRGIN mode represents a most open mode. In one embodiment, a system can leave a fabrication facility in a VIRGIN mode. Systems in a VIRGIN mode can still be subject to test, program, and if appropriate, repair steps.

A next more restrictive mode can be the OPEN mode. In an OPEN mode, a processor can have access to privileged locations only in a privileged mode. Accesses via debug and test ports can only access nonprivileged (i.e., user) regions. In one embodiment, following testing (and repair, if appropriate), systems can be programmed with proprietary manufacturer code. Any areas of memory (e.g., ROM, Flash memory and/or RAM) that need to be protected can be identified in predetermined supervisory sections of the Flash memory. Systems can then be programmed into the OPEN mode to prevent access to such areas needing protection. In one embodiment, systems can be shipped to customers in the OPEN mode.

The next more restrictive mode can be the PROTECTED mode. In the PROTECTED mode, a processor can have access to privileged locations as in the OPEN mode. However, accesses via a debug access port are prohibited. Further, access via a test port can be restricted to non-privileged registers. Access to nonprivileged mode registers can enable system calls (as described herein) to be made. In one embodiment, after a user (e.g., customer) programs a system with user code, the system can be placed in the PROTECTED MODE, providing protection to the user's code. According to one embodiment, once in the PROTECTED mode, re-programming to a less restrictive mode (e.g., OPEN, VIRGIN) is possible only by erasing all user code.

A most restrictive mode can be the KILL mode. In a KILL mode no test or debug access is possible. It is noted that such a mode prevents any failure analysis of the system by such restrictive access.

As noted previously, the BOOT mode can be a transitory state, rather than a mode established by a manufacturer or customer. In the BOOT mode, a processor has free access to system locations, while debug and test ports are stalled.

FIG. 5 is another table showing restrictions on accesses of a processor system based on different modes according to one particular embodiment. In FIG. 5, column "Protection" identifies a protection mode. A column "From" indicates a source of an access. CPU(PM) represents a processor request in a privileged mode. CPU(UM) represents a processor request in a nonprivileged (i.e., user) mode. DAP represents a debug/test access port.

The columns "To CPU PBB/ROM/FLASH/SFLASH/BUS Registers" show destinations of requests. "CPU PBB" can be system regions of a processor. "ROM" can be a system ROM. "FLASH" can be a flash memory having supervisory sections. "SFLASH" can be additional system flash memory. "BUS Registers" can be storage registers in a processor system and can include both privilege registers and nonprivileged (user mode) registers. In the various columns, "Exec Only" represents execution only accesses. That is, such accesses do not read data from such a location, but rather execute code residing at the location. (However, in some embodiments, such executable code can be can be programmed to read data from such locations). "UM" stands for user mode.

It is noted that in all protection modes other than VIRGIN, a DAP port cannot access privileged registers. In some embodiments, such a restriction prevents access to program and erase registers in a Flash memory programming interface. Accordingly, programming and/or erasing of a Flash memory can be accomplished through system calls into the ROM.

As noted above, transitions between protection modes can be restricted to ensure proprietary data is not accessible. A protection mode policy according to one embodiment is shown in a state transition diagram in FIG. 6.

A protection policy 600 can be implemented in supervisory ROM code. As shown, upon completion of manufacturing, a processor system can be in the VIRGIN mode 602. From the VIRGIN mode, a processor system can be loaded with manufacturer's (mfg) proprietary code, and then programmed to the OPEN mode 604 to restrict access to the mfg's proprietary locations. A customer can program the processor system with its own proprietary code. A customer can then program the system to the PROTECTED mode 606 to restrict access to the customer's code.

As noted above, it is also possible to program a processor system to a KILL mode 608. According to protection policy 600, a KILL mode 608 can be irreversible. That is, once a processor system is programmed into such a mode, it cannot be programmed to any other protection mode.

Figure 6:
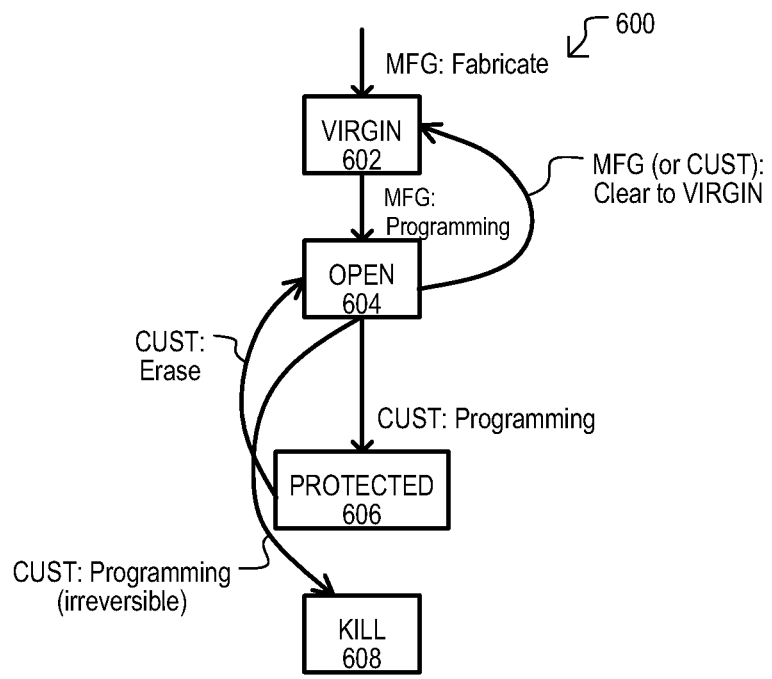
FIG. 6 is a state diagram showing a processor system protection policy according to an embodiment.

Referring still to FIG. 6, from a PROTECTED mode 606, a processor system can be returned to the OPEN mode 604. However, such an action results in an erasure of customer data (but not mfg data). Similarly, from an OPEN mode 604, a processor system can be returned to the VIRGIN mode 602. However, such an action results in an erasure of manufacturer data.

Figure 7:
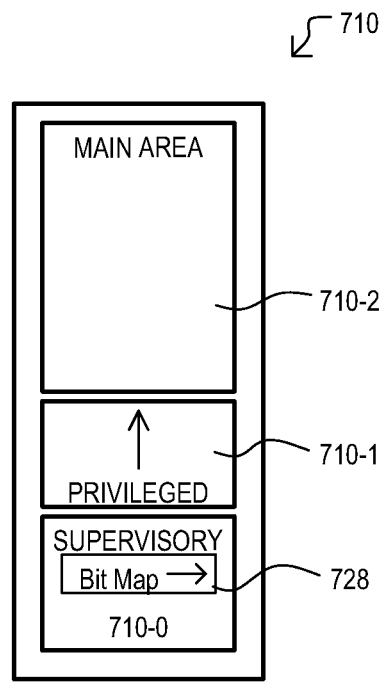
FIG. 7 is a diagram showing a processor system protection policy implemented with a block erasable memory according to an embodiment.

Referring to FIG. 7, a protection policy for a Flash memory according to an embodiment will now be described. Such a protection policy can be implemented in supervisory ROM.

A Flash memory 710 can include a supervisory region 710-0 and a main area 710-2. A privileged area 710-1 can be created by restricting access based on restriction data 728 stored within supervisory region. In one particular embodiment, restriction data 728 can be a per row bit mask that identifies restricted rows within a Flash memory.

In one embodiment, according to a protection policy, increasing a number of restricted rows can be accomplished with system calls. Such system calls can increase to restriction data 728 by identifying additional privileged areas (710-1), and enabling data to be programmed into such additional privileged areas. However, reduction of protected rows is only possible with a full erase that returns the Flash memory 710 to the OPEN, VIRGIN or an empty state.

Figure 8:
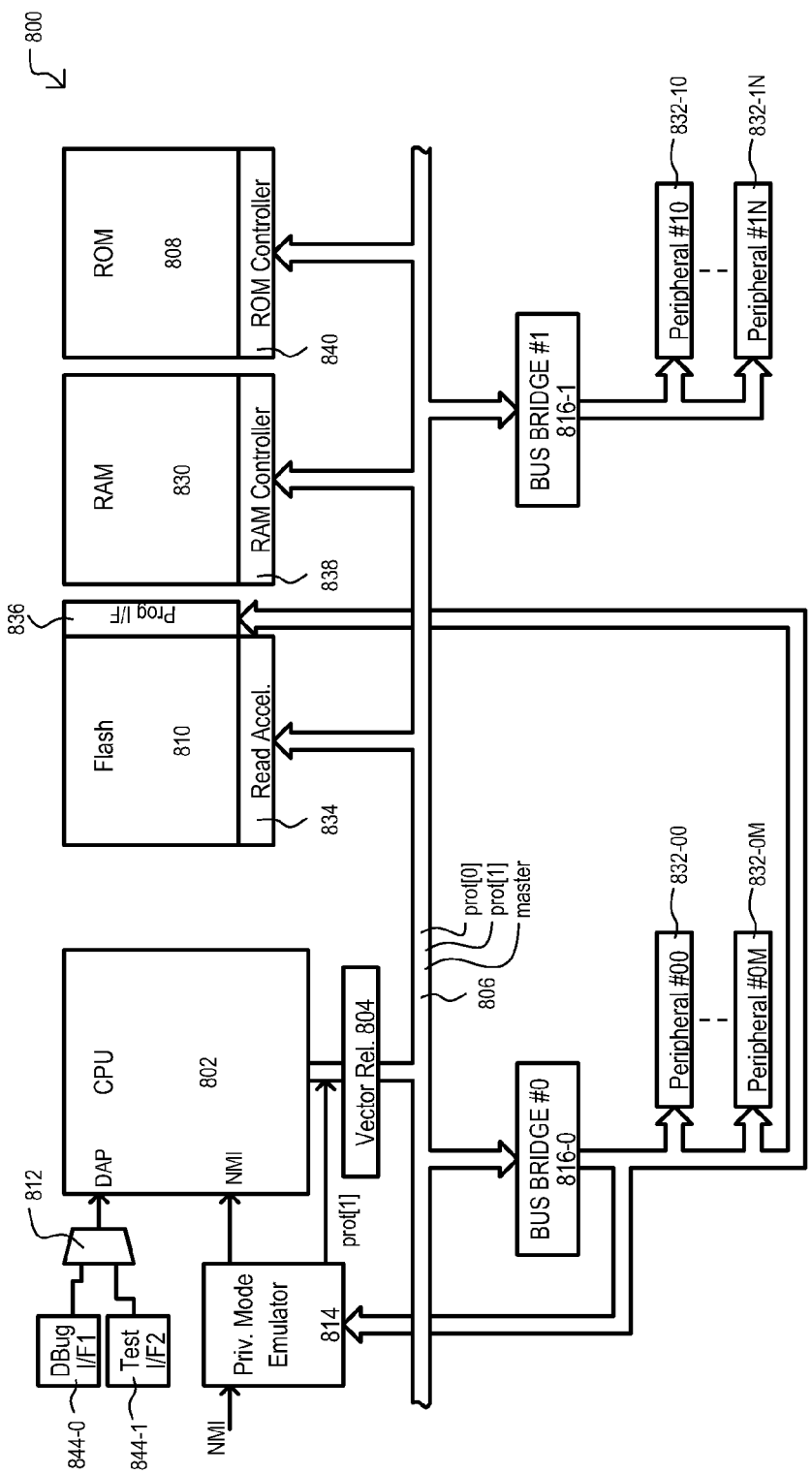
FIG. 8 is a block schematic diagram showing a processor system according to another embodiment.

Referring now to FIG. 8, a processor system 800 according to a further embodiment is shown in block schematic diagram. A processor system 800 can be one implementation of that shown in FIG. 1, and like sections are referred to by the same reference character but with the first digit being an "8" instead of a "1". A system 800 can implement any of the protection schemes noted above or equivalents.

FIG. 8 differs from FIG. 1 in that is shows a RAM 830 and peripheral devices 832-00 to -1N connected to bus bridges 816-0/1. Further, a Flash memory 810 has a read accelerator circuit 834 and program interface (I/F) 836. RAM 830 shows a RAM controller 838 and ROM 808 shows a ROM controller 840. A debug I/F 844-0 and a program test interface 844-1 can be connected to a test/debug access port 812.

A bus 806, in addition to data, address and other control signals, can include protection signals prot[0], prot[1], and a bus master signal "master". Signal prot[0] can indicate whether an access is a code fetch or data read/write. Signal prot[1] can indicate whether a processor 802 is operating in a privileged mode or nonprivileged mode. Signal "master" can indicate if the transaction originates from a processor 802 or test access port 812.

Protection mechanisms of processor system 800 will now be described.

As in the case of FIG. 1, a processor 802 can block all or part of accesses via test access port 812 based on a protection mode. In particular, when in a PROTECTED mode, accesses to privileged regions can be blocked, and when in a KILL mode, all access can be blocked. In one embodiment, a test access port 812 can be a slave device with respect to control via bus 806.

Within Flash memory 810, a read accelerator circuit 834 can block read accesses based on both a protection mode (e.g., VIRGIN, OPEN, PROTECTED, KILL), as well as processor mode (e.g., privileged or user). A programming I/F 836 can block programming accesses to Flash memory 810 according to a protection mode and registers that can distinguish protected regions from nonprotected regions.

Within RAM 830, RAM controller 838 can block access to protected regions based on a protection mode and processor mode of operation (i.e., privileged or not).

Code within ROM 808 can implement protection policies for programming and erasing Flash memory 810 as noted above (e.g., erasing blocks when switching to a lower protection mode). Such actions are only accessible in a privileged mode of operation. Access to ROM 808 can be prevented except by a system call (execution of code from a reset condition or NMI). A ROM controller 840 can monitor all code fetch accesses based on signal prot[0]. As noted above, such a signal can indicate when an access is not a code fetch from ROM 808. Accesses to addresses corresponding to reset and NMI vector calls are always permitted. When such accesses occur, a system call and privileged mode emulator 814 can open up a ROM 808 for further code execution. In one embodiment, this can include setting a ROM access enable bit. Such a bit can be reset in the event a fetch is from somewhere other than the ROM 808.

Referring still to FIG. 8, peripheral devices 832-00 to -1N can be connected to bus bridges 816-0/1. Access to peripheral devices (832-00 to -1N) can be restricted based on both protection mode, and mode of operation (e.g., privileged or nonprivileged).

As noted above, a processor system can be placed into a privileged mode in response to an interrupt and system call. Implementation of such privileged mode according to one embodiment will now be described. It is noted that such an implementation need not modify a processor. That is, the following embodiments can enable the creation of a privileged mode of operation when such a feature is not built into a processor.

FIGS. 9A to 9D are a sequence of block schematic diagrams showing privileged mode operations according to an embodiment. FIGS. 9A to 9D show items like those in FIGS. 1 and 8, and such like items are referred to by the same reference character but with the first digit being "9".

FIGS. 9A to 9E show a privileged mode emulator 914 having a system call ID register 946 and a control register 948. Such registers can store control bits for establishing a privileged mode of operation, as well as identification data, which can identify a system function for execution in the privileged mode. An interrupt multiplexer (MUX) 950 can apply NMIs to processor 902. Such NMIs can originate from suitable hardware (not shown), and can also originate from privileged mode emulator 914.

A ROM 908 can include a privileged region 918 which can hold an NMI handler 954 and a system function 952. It is noted that such code can be stored in protected regions of other memories. However, a vector table pointing to NMI handler 954 resides in ROM 940.

FIGS. 9A to 9D also show a user (nonprivileged) memory region 958 which can store a system call 956 for execution. It is understood that a user memory region 958 can be part of any suitable memory in the system 900, such as a user region of a ROM 908, Flash memory 910, or RAM 930, as but examples.

Figure 9A:
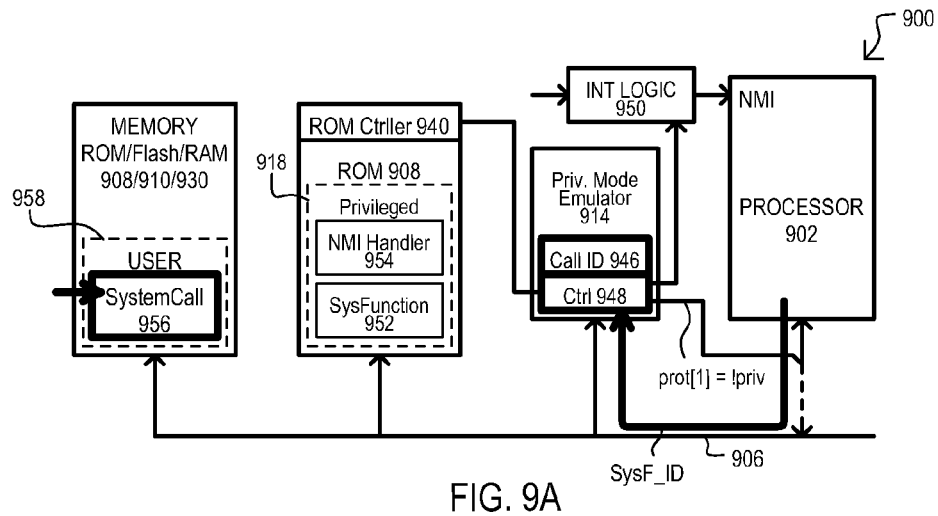
FIGS. 9A to 9D show a sequence of block schematic diagrams illustrating privileged mode circuits and operations of a processor system according to an embodiment.

Referring to FIG. 9A, it is assumed that a system 900 can be in a user mode of operation, indicated by signal prot[1] being de-asserted (i.e., prot[1]=!priv). In a switch to a privileged mode of operation, a system call 956 can be made from a user region 958. In this way, a switch to a privileged mode can be started in a nonprivileged mode. Execution of a system call 956 can include the writing of values to registers 946 and 948 that can identify a particular system function for execution. A system call 956 may then wait for a particular interrupt.

Figure 9B:
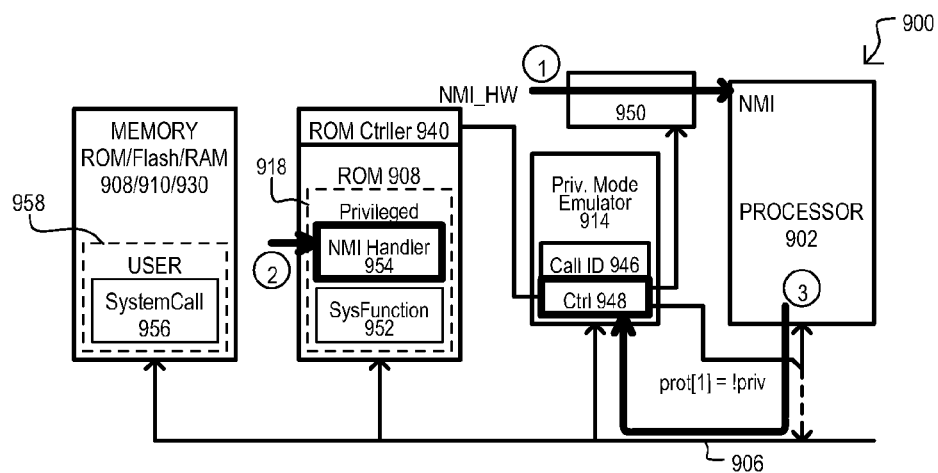

Referring to FIG. 9B, in response to an appropriate interrupt (shown by circle 1), a processor 902 can jump to a vector table in ROM 908 to execute an NMI handler 954 (shown by circle 2). NMI handler 954 can write control values to register 948 that can place the system into a privileged state (shown by circle 3).

Figure 9C:
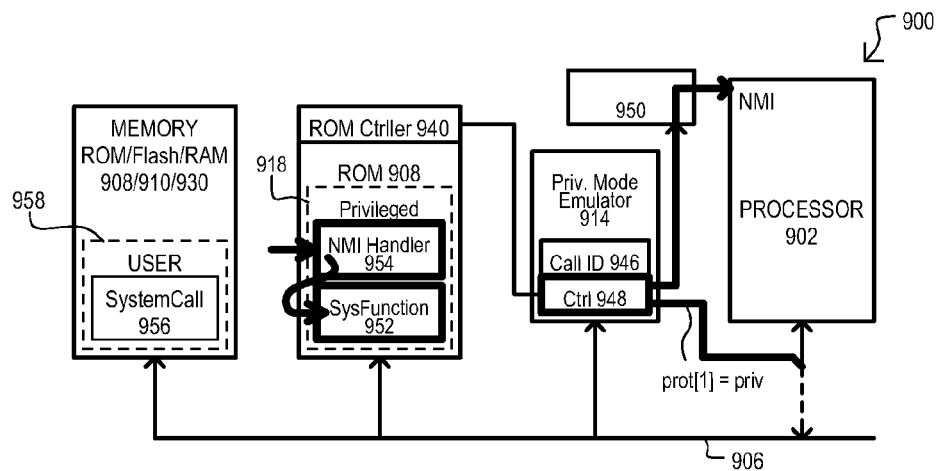

Referring to FIG. 9C, in response to control values in register 948, system 900 can be in the privileged state. In such a state, values in control register 948 can result in privileged mode emulator 914 maintaining an interrupt through interrupt MUX 950. Also in response to control register 948, signal prot[1] on bus 906 can be asserted to the privileged state (prot[1]=priv) indicating a privileged mode to other system sections, including peripherals. At this time, NMI hander 954 can call a system function 952 identified by data in system call ID register 946.

Figure 9D:
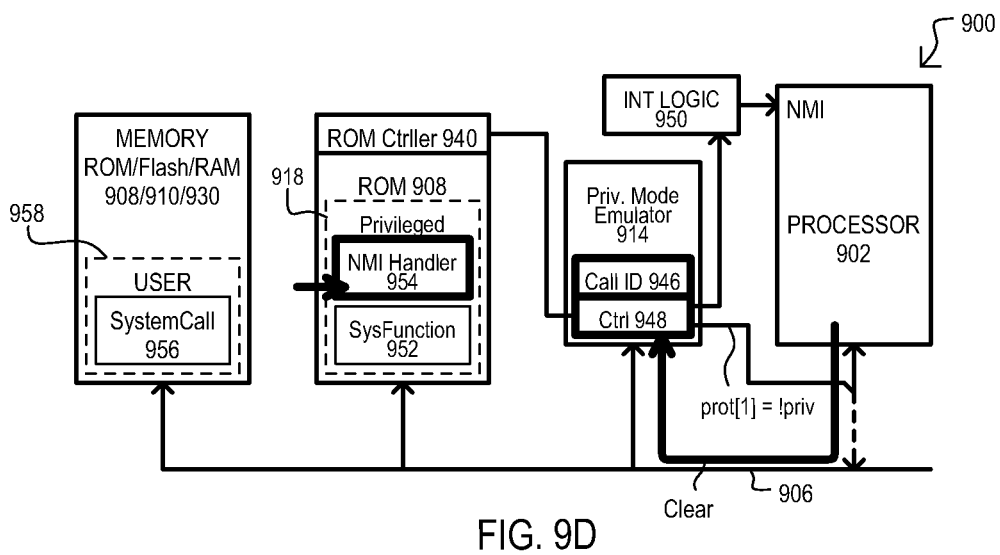

Referring to FIG. 9D, at the conclusion of the NMI handler 954, registers 946 and 948 can be cleared, returning system 900 to a nonprivileged state. An interrupt through interrupt MUX 950 is de-asserted, and signal prot[1] on bus 906 can be de-asserted.

In this way a system call in a nonprivileged state can utilize an NMI and corresponding handler to enter a privileged state.

Figure 10A:
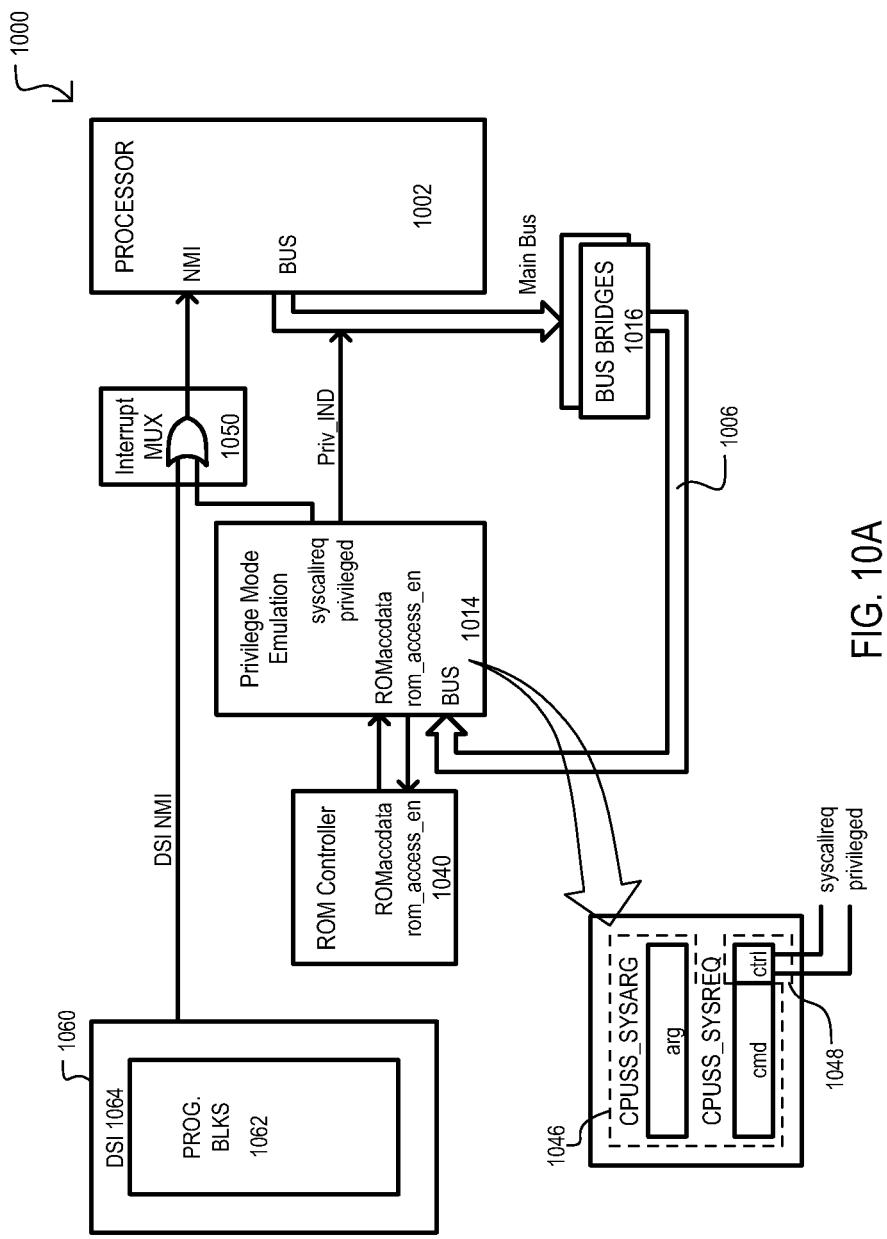
FIGS. 10A to 10O are block schematic diagrams showing privileged mode circuits and operations of a processor system according to another embodiment.
Figure 10B:
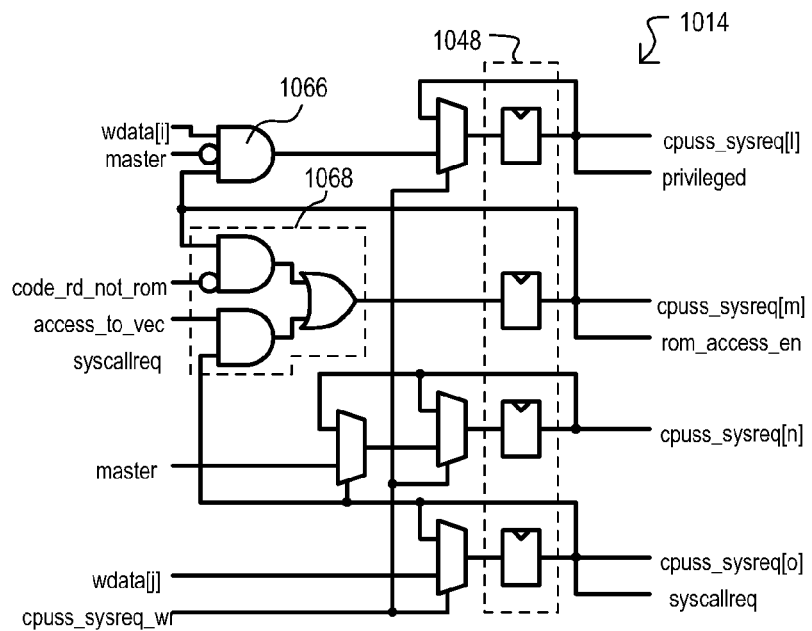
Figure 10C:
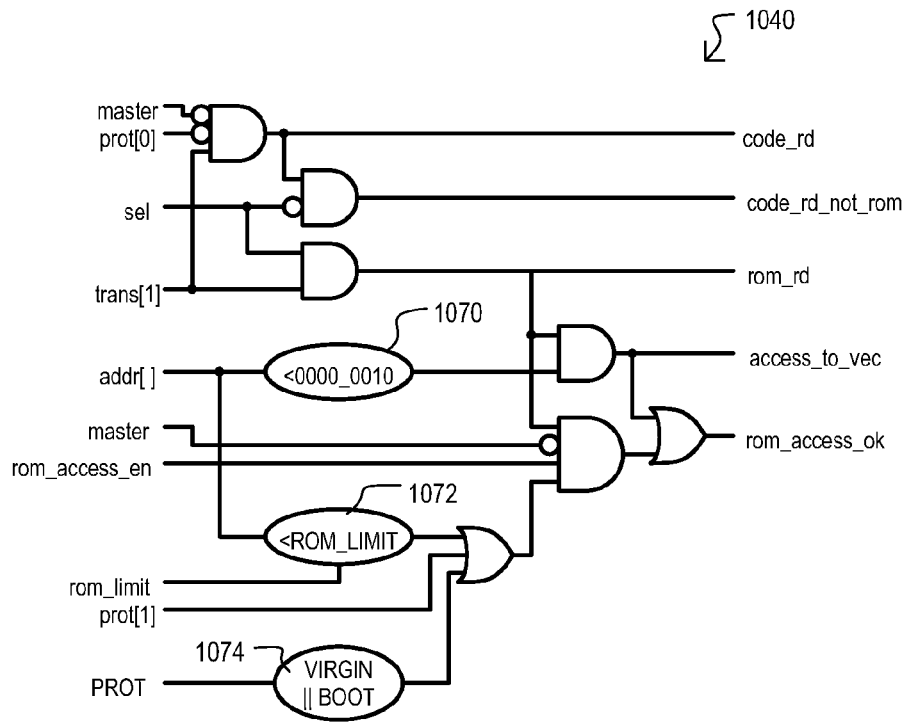

Referring now to FIGS. 10A to 10C, a processor system 1000 according to another embodiment is shown in block schematic diagram. System 1000 can include sections like those of FIGS. 9A-9D, and like sections are referred to by the same reference character but with the leading digits being a "10" instead of a "9". A system 1000 can implement any of the protection schemes noted above or equivalents.

Referring to FIG. 10A, in one embodiment, a processor system 1000 can be all or part of a programmable system-on-chip, and can include a programmable section 1060. A programmable section 1060 can include programmable blocks 1062 and an interconnect fabric 1064. Programmable blocks 1062 can be programmed into various circuits according to configuration data. Interconnect fabric 1064 can be programmed to provide interconnection between programmable blocks 1062. In one particular embodiment, either of privilege mode emulator 1014 or interrupt MUX 1050 can be formed from programmable blocks (i.e., are part of 1062).

Referring still to FIG. 10A, in the system 1000 shown, a privilege mode emulator 1014 can include registers CPUSS_SYSARG and CPUSS_SYSREG. Register CPUSS_SYSARG can store a value "arg" that can be an argument corresponding to a system function called by a system call. In one embodiment, arg can be a 32-bit value. A portion of register CPUSS_SYSREQ can store a system function ID "cmd", while another portion can store control bits "ctrl". In one embodiment, cmd can be a sixteen-bit value. Control bits "ctrl" can provide output signal "syscallreq", which can serve as an interrupt, and "privileged" which can serve as a mode indicator for a bus line (prot[1]). In one embodiment, four control bits can be provided.

A ROM controller 1040 can provide output values (ROMaccdata) to privilege mode emulator 1014. Such values can indicate when accesses are (or are not) to the ROM. A privilege mode emulator 1014 can use such values to determine whether or not conditions exist for a privileged mode, or to reset control bits (ctrl) to exit a privilege mode for improper accesses.

In addition, privilege mode emulator 1014 can provide a ROM access enable signal "rom_access_en" that can enable access to privileged ROM locations in a privilege mode.

Operations of system 1000 will now be described. As in the case of FIGS. 9A to 9D, in a privileged mode, an NMI handler can be executed in response to an NMI. The NMI handler can maintain an NMI in an asserted state by writing to register 1048 to enable privilege mode emulator 1014 to assert syscallreq. In addition, privilege mode emulator 1014 can restrict accesses to ROM (not shown) except for accesses resulting from a NMI initiated system call, as described herein. One exception to such a restriction can be a reset event, which can end up executing from the ROM, as described above.

As shown previously in FIG. 2, when a configuration bit CPUSS_SYSREQ.SYSREQ is set, the NMI vector forces a call from ROM. However, at the same time, other (user) NM's can allow fetches from vector tables in other memories (e.g., Flash memory, RAM). Such a feature can allow system calls to take priority over user NMI assertions. In one embodiment, a register CPUSS_SYSREQ can further include a DSI_NMI. Such a bit can be set to ensure a system call cannot be made from within an NMI handler.

Referring to FIG. 10B, a portion of a privileged mode emulator 1014 according to an embodiment is shown in a schematic diagram. Signals "wdata[i]", "wdata[j]" can be write data values. A "master" signal can indicate an access by ROM (0), or some other source (1) (e.g., debug access port). Signal "code_rd_not_rom" can be a signal from a ROM controller indicating that an access is not from the ROM. Signal "access_to_vec" can also be generated by a ROM controller to indicate that an access is a vector access. Signal "cpuss_sys_req_wr" can be a request to write to control register 1048 (only the control bit portion of control register 1048 is shown in FIG. 10B).

Referring still to FIG. 10B, logic 1066 can ensure that a privileged bit (cpuss_sysreq[I]) cannot be set if an access is not from ROM (i.e., master=1). Logic 1068 can ensure that value rom_access_en (i.e., access to the ROM) cannot be set if a code read is not from a ROM (code_rd_not_rom=1).

Referring to FIG. 10C, a portion of a ROM controller 1040 according to an embodiment is shown in a block schematic diagram. Signals "prot[0]" can indicate a code fetch or data read/write. Signal "sel" can indicate a start of a transfer over a bus. Signal "trans[1]" can indicate a type of transfer on a bus. Signals addr[ ] can be address values on a bus. Value "rom_limit" can be a ROM address limit provided to 1072. Value PROT can be a protection value as noted above (e.g., VIRGIN, OPEN, PROTECTED, KILL). Signal "code_rd" can indicate a code read is occurring. Signal "rom_rd" can indicate a ROM read is occurring. Signal "rom_access_ok" can indicate that a current ROM access is permitted.

Referring still to FIG. 10C, section 1070 can compare a received address to an address limit to determine if a vector call is occurring. If such a condition is true, it can provide an output of logic 1. In the embodiment shown, if an address is less than 0000_0010, it can be determined to be a vector call. Section 1072 can compare an address to a ROM limit. If an address is less than a limit, section 1072 can output a logic 1. Section 1074 can determine if a protection mode is low enough to allow ROM access. In the embodiment shown, if a protection mode is VIRGIN or BOOT, an output can be asserted to logic 1.

Referring now to FIG. 11, a pseudocode example of a system call (SystemCall) routine is shown. Such a SystemCall routine can set registers to values to identify a system function (with cmd and arg). In addition, it can set control bits to asserted levels (1U<<31). While such bits remain set, the SystemCall can wait for an interrupt to initiate an interrupt handler. A SystemCall sequence can also be performed with a tester or debug probe. In such a case, a bit in CPUSS_SYSREQ can be set to indicate the source of the SystemCall.

Referring now to FIGS. 12A and 12B, a pseudocode example of an NMI handler (NmiHandler) according to an embodiment is shown. An NmiHandler both starts and ends in a nonprivileged mode. In the embodiment shown, NmiHandler can only be entered from a system call NMI (NMI ISR), and thus is hardware interlocked. If appropriate hardware signals are not generated, the NmiHandler will call the system function.

An NmiHandler can retrieve the system function information to ensure a correct system function is called (assigning cmd, src, and arg values). NmiHandler can then check for a patched version of itself. If such version exists, it can jump to a copy of itself in Flash memory (NmiHandlerinFlash). Upon conclusion of the NmiHandler, control bits can be reset (CPUSS_SYSREQ=0) to return the system to the nonprivileged mode.

Embodiments above have shown System Call routines that can wait for particular interrupt(s) to trigger a desired NMI handler for entering a privileged mode. In some embodiments, such System Call routines can be responsive to other interrupts. Embodiments incorporating such capabilities will now be described.

Figure 13A:
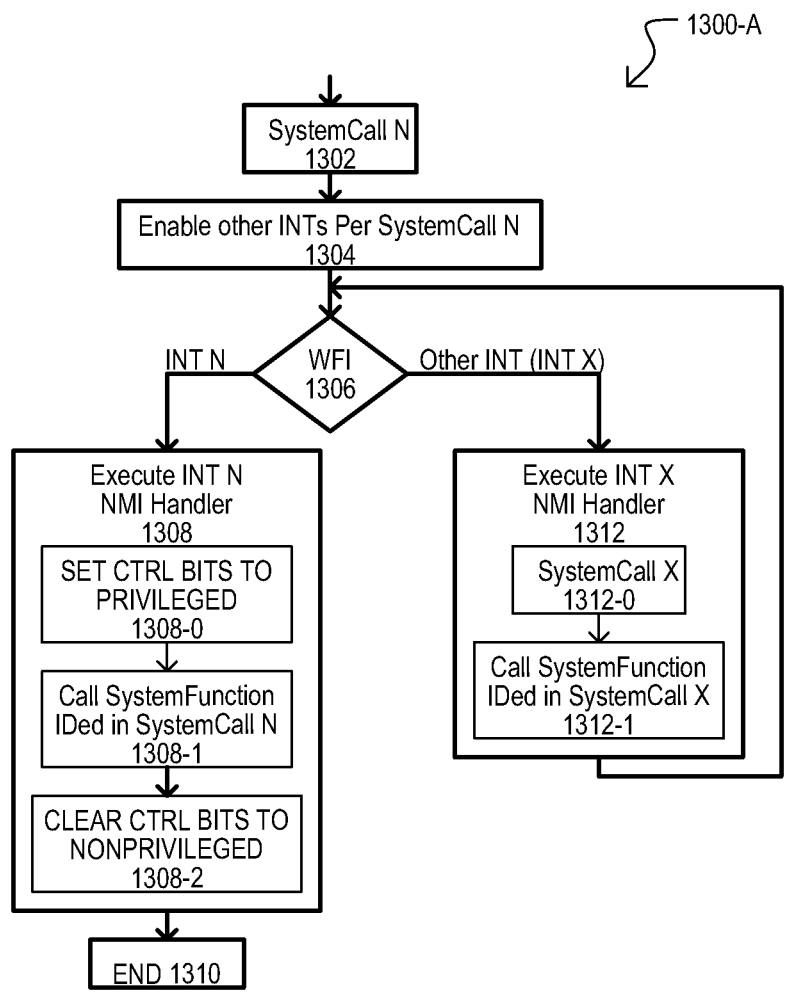
FIGS. 13A and 13B are flow diagrams showing interrupt handling of system call functions according to embodiments.

Referring to FIG. 13A, one example of a System Call routine 1300-A (hereinafter SystemCall N) responsive to other interrupts is shown in a flow diagram. SystemCall N can be called in a nonprivileged mode of operation, as described above, or in an equivalent fashion. SystemCall N can be initiated (1302). SystemCall N can then designate other interrupts that can be responded to (1304). SystemCall N can wait for an interrupt (1306).

If an interrupt associated with SystemCall N is received (INT N from 1306), SystemCall N can execute the intended INT handler (1308). INT handler 1308 can place a processor system into a privileged mode by setting control bits (1308-0), can call a SystemFunction identified by SystemCall N (1308-1), and upon conclusion, clear control bits (1308-2) to return to a nonprivileged mode.

However, if one of the other interrupts is received, that is an interrupt declared in 1304 (INT X from 1306), the interrupt handler associated with INT X 1312 can be executed. The INT X interrupt handler 1312 can execute its own system call routine (SystemCall X) 1302-0, which in the embodiment shown, can call a system function identified in SystemCall X 1302-1. Upon completion of the INT X handler 1312, control is returned to SystemCall N. Accordingly, interrupts remain in the states established by SystemCall N (in box 1304).

In this way, a system call routine can implement a nonblocking wait for interrupt.

Figure 13B:
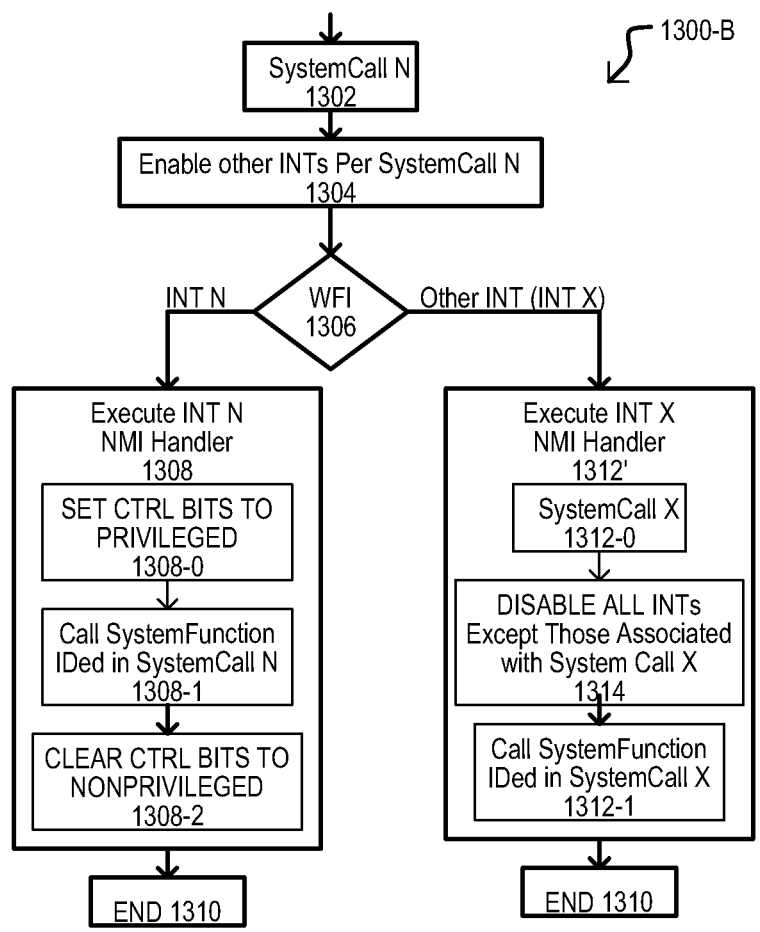

Referring to FIG. 13B, another example of a SystemCall N 1300-B is shown in a flow diagram. SystemCall N 1300-B can include sections like those of FIG. 13A, and such like sections are referred to by the same reference character.

SystemCall N 1300-B can differ from that of FIG. 13A in that all interrupts except those associated with intervening SystemCall X can be disabled (1314). Further, control is not returned to SystemCall N 1300-B. That is, the intervening interrupt (INT X) can block completion of SystemCall N 1300-B.

In this way, a system call routine can implement a blocking wait for interrupt.

While embodiments above have a shown processor systems implemented as microcontrollers, ASSPs or programmable and/or nonprogrammable systems-on-chip, in one very particular embodiment, such processor systems can form all or part of a PSoC@ programmable embedded system-on-chip manufactured by Cypress Semiconductor Corporation of San Jose, Calif., having an ARM® Cortex™ processor embedded therein.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A system, comprising:
    a processor coupled to a bus;
    protection registers coupled to the bus, the protection registers configured to store first protection values and second protection values;
    a first memory coupled to the bus, the first memory including a privileged portion;
    a second memory coupled to the bus, the second memory including a privileged supervisory portion, wherein the first protection values are configured to limit access to the privileged portion and the privileged supervisory portion according to a first protection mode and the second protection values are configured to limit access to the privileged portion and the privileged supervisory portion according to a second protection mode;
    a boot sequence stored in the privileged portion that configures the processor to decode first values stored in the supervisory portion into the first protection values;
    an interrupt handler configured to place a processor into a privileged mode to access second values stored in the supervisory portion to decode the second values into the second protection values; and
    a privileged mode emulation circuit comprising a storage element accessible by a system call to the privileged portion of the first memory in response to a nonmaskable interrupt (NMI) to the processor, the storage element having a privileged mode output coupled to a signal line of the bus, wherein the values of the storage element establish the privileged mode for the system.

2. The system of claim 1, wherein:
    the processor, first memory and second memory are formed in a same integrated circuit package.

3. The system of claim 1, wherein:
    the processor, first memory and second memory are formed in a same integrated circuit substrate.

4. The system of claim 1, wherein:
    the first memory comprises a read-only-memory (ROM); and
    the second memory comprises an electrically programmable and block erasable read only memory.

5. The system of claim 1, further including
    at least one access port for testing or debugging the system;
    the second memory further includes a nonprivileged portion;
    a privileged mode register that establishes a privileged mode of operation;
    the privileged portion of the first memory and the privileged supervisory portion comprise privileged regions of the system;
    in response to the protection value being an open value, the processor is configured to have access to the privileged regions only in a privileged mode of operation, and
    the access port does not have access to the privileged regions but has access to the nonprivileged portion; and in response to the protection value being a protected value,
the processor is configured to have access to the privileged regions only in a privileged mode of operation, and
the access port does not have access to the privileged regions or the nonprivileged portion.

6. The system of claim 1, wherein:
at least one system circuit resource that is accessible or not accessible according to the protection values.

7. The system of claim 1, wherein:
the second memory is writable and erasable only in the privileged mode.

8. The system of claim 1, further including:
a vector relocator configured to
redirect first hardware initiated vector calls only to executable routines in a privileged portion of the first memory, and
redirect second hardware initiated vector calls to locations in any of: the first memory, the second memory or a random access memory (RAM) coupled to the bus.

9. A method for establishing protection modes in a processor system, comprising:
in response to a reset condition of the system, establishing a first protection mode comprising executing a boot sequence stored in a privileged portion of a first memory that decodes first encoded protection data stored in a privileged portion of a second memory to generate first decoded protection data;
restricting access to the first and second memory according to the first protection mode;
in response to an interrupt, using a privileged mode emulation circuit comprising a storage element accessible by a system call to the privileged portion of the first memory in response to a nonmaskable interrupt (NMI) to the processor, the storage element having a privileged mode output coupled to a signal line on a bus to establish a second protection mode and to indicate the second privileged mode on the bus, the bus coupled to the processor; and
after restricting access to the first and second memory according to the first protection mode, selectively restricting access to the first and second memory according to the second protection mode; wherein the second memory is section erasable to one value.

10. The method of claim 9, wherein:
the decoded protection data can indicate at least an open state or a protected state; and
in the open state
enabling a processor of the system to execute code stored in a privileged region of the first memory in a privileged mode but not a user mode, to access privileged regions of the second memory in a privileged mode but not the user mode, and access privileged registers in a privileged mode but not the user mode, and
preventing test port accesses to the code stored in the first memory, to privileged portions of the second memory, and to privileged registers; and
in the protected state
enabling processor accesses as when the open state is indicated, and
preventing test port accesses to the first memory, to the second memory, and to the privileged registers.

11. The method of claim 10, wherein:
the decoded protection data can further indicate a virgin state or a kill state; and in the virgin state
enabling processor accesses to execute code stored in the first memory, to access privileged portions of the second memory regardless of mode, and to access privileged registers regardless of mode, and
preventing test port accesses to the first memory, and enabling test port accesses to privileged portions of the second memory, and to the privileged registers;
in the kill state
enabling processor accesses as when the open state is indicated, and
preventing test port accesses to the first memory, to the second memory, and to both privileged and nonprivileged registers.

12. The method of claim 10, wherein:
the second memory selectively writes one logic value to bit locations in a program mode and block erases groups of bit locations to a second logic value; and
the encoded protection value corresponding to the decoded open value includes only the second logic value.

13. The method of claim 9, further including:
selectively restricting access to at least one system circuit resource according to the decoded protection data.

14. An apparatus comprising:
a privileged mode emulation circuit configured to couple with a processor and a first memory through a bus, the privileged mode emulation circuit comprising a storage element accessible by a system call to a privileged portion of the first memory in response to a nonmaskable interrupt (NMI) to the processor, the storage element having a privileged mode output coupled to a signal line of the bus, wherein the values of the storage element establish a privileged mode for the system, wherein the privileged mode emulation circuit is configured to couple with protection registers and a second memory through the bus, the protection registers configured to store first protection values and second protection values, the second memory including a privileged supervisory portion, wherein the first protection values are configured to limit access to the privileged portion and the privileged supervisory portion according to a first protection mode and the second protection values are configured to limit access to the privileged portion and the privileged supervisory portion according to a second protection mode.

15. The apparatus of claim 14, wherein the privileged portion is configured to store a boot sequence that configures the processor to decode first values stored in the supervisory portion into the first protection values.

16. The apparatus of claim 14, wherein the privileged mode emulation circuit is configured to couple with an interrupt handler through the bus, the interrupt handler configured to place the processor into the privileged mode to access second values stored in the supervisory portion to decode the second values into the second protection values.

17. The apparatus of claim 14, wherein the first memory comprises a read-only-memory (ROM), and the second memory comprises an electrically programmable and block erasable read only memory.

18. The apparatus of claim 14, wherein the second memory is writable and erasable only in the privileged mode.

* * * * *